UNITED STATES PATENT OFFICE.

HARRY O. CHUTE AND FRANK L. RANDEL, OF NEW YORK, N. Y.

PROCESS OF PRODUCING RUBBER.

957,495.

No Drawing.

Specification of Letters Patent. Patented May 10, 1910.

Application filed March 10, 1909. Serial No. 482,477.

*To all whom it may concern:*

Be it known that we, HARRY O. CHUTE and FRANK L. RANDEL, citizens of the United States, residing at New York, in the county of New York and State of New York, have invented certain new and useful Improvements in Processes of Producing Rubber, of which the following is a specification.

This invention relates to processes of producing rubber; and it comprises a method of directly producing clean, commercially pure rubber from crude or raw vegetable materials containing rubber and adhesive or adhering resins wherein such material is comminuted and is treated with a neutral volatile solvent capable of dissolving such resins but without chemical action upon other constituents and having no substantial solvent power for rubber and thereafter separating rubber from the deresinated material; all as more fully hereinafter set forth and as claimed.

Many woods and other vegetable materials such as the guayule shrub, fig leaves, twigs and wood, plants of the semiarid regions of the Rocky Mountains, etc., have been found to contain valuable quantities of rubber which cannot be obtained by allowing the latex to exude and coagulate, as is the practice in obtaining rubber from the older varieties of rubber-yielding plants. In these materials the rubber is already coagulated in the fiber and it is necessary to comminute the wood and extract the rubber therefrom. This extraction is done by various methods. One of the commoner methods now in use is to macerate the rubber-containing wood in the presence of water, generally hot. In this process the woody material is stirred and broken up in the presence of the water for a long time, by which operation the fiber proper is saturated with water, so that it is rendered heavy and sinks while the particles of rubber mutually adhere into flakes or coagula which will float. Unfortunately, all these woody materials contain resin in addition to the rubber, and this resin is generally of a rather sticky character, and particularly in the case of guayule causing wood and rubber to stick together, so that the process does not give as good a separation and as large a yield of pure material as can be desired. The resinous matter is more adhesive than cohesive, and it causes particles of rubber to adhere to the woody fiber so that they are lost and it also causes particles of woody fiber to adhere to the rubber. This results in a loss of rubber on the one hand and a contamination of the recovered rubber on the other. Much sand, dirt and other mechanical impurities also go with the rubber as a result of this adhesive action.

In the best modern practice, the rubber so recovered, which contains resin and mechanical impurities is next treated with solvents to remove the resin and after this is again treated to free it of such mechanical impurities; as by remacerating with water. The rubber being freed of sticky resins by the deresination can now be freed of such mechanical impurities.

The rubber is apt to be deteriorated by the long-continued agitation which is necessary in these operations to produce a fairly clean rubber. Rubber upon much working loses "nerve", as the term is, becoming more and more soft and plastic. While this deterioration is probably frequently only temporary, the rubber upon standing regains its character, yet it injures the commercial grading of the product thus produced. Long-continued grinding of rubber or rubber-containing materials is therefore undesirable. But in the stated operation in order to produce a fair separation of rubber from the vegetable fiber, long grinding is substantially necessary.

We have discovered that by preliminarily treating the crude woody material with a volatile solvent in which the resin is soluble while the rubber is substantially insoluble, the deresinated material may thereafter be treated by the described macerating process with a great improvement in the quantity and quality of the rubber recovered. A much shortened grinding operation is made possible. With the water-proofing resin removed, but with the material otherwise unchanged, the entrance of water and the separation of rubber and woody material are quick and thorough. Rubber may be said to be more cohesive than adhesive; that is, the particles of rubber display a greater tendency to cohere together than to adhere to other materials while the rubber resin has the reverse properties. With the resin removed there is little stickiness left in the material. On macerating the deresinated material, therefore, the woody fiber on saturation with water together with the dirt and sand, etc., tend to sink and are substantially free of rubber, while on the other hand the floating flakes or coagula of rubber are substantially free of mechanical impurities. More rubber is recovered and it is of a better quality. Long working is not necessary.

The solvent which is used to remove the resin preliminarily may be any of the volatile, non-aqueous, chemically neutral or indifferent organic liquids which are customarily grouped together as "volatile solvents," the volatile solvent used being of course one in which resin is soluble. For the present purposes, it is also desirable that it be one in which rubber is substantially insoluble and that it be one which is miscible with water. For instance, ordinary alcohol, either grain alcohol or wood alcohol may be employed. A better solvent for this purpose, however, is afforded by the various esters or ethereal salts of the various fatty acids with the alcohols. The acetates, formates, butyrates, etc., of ethyl or methyl alcohol may be used advantageously as they have a high solvent power for rubber resins with very little solvent power for rubber itself. Such esters, however, are somewhat susceptible to the action of water, which tends to hydrolyze them; that is, breaks them up into the original alcohol and acid to some extent. And for this reason it is better to use them in the presence of a protective body, such as alcohol. By mixing an alcohol with the ester of that alcohol, as by mixing methyl-alcohol with methyl acetate, the tendency of the ester to break up in the presence of water is much reduced or is obliterated. Acetone has a similar protective action on these esters. The admixture of these protective bodies with the solvent esters has the further advantage that while it does not much diminish their high solvent power for rubber resins, it does diminish considerably their slight solvent action on rubber itself. Such mixtures or protected esters, are preferably used in the present invention. However, ethyl alcohol, methyl-alcohol, acetone, "methyl acetone", crude wood spirit and many other similar deresinating solvents may be employed. Grain alcohol and wood alcohol as well as acetone, "methyl acetone", denatured spirit, etc., are much better solvents of the resins from guayule than of the resins of other rubber yielding plants. They may therefore be used with advantage in the present invention in treating guayule.

Any suitable form of extracting apparatus may be employed in the deresinating operation. Whatever the apparatus, it may be provided with chipping, breaking, cutting or stirring means to permit rapid and thorough extraction of the comminuted vegetable material and it may be advantageously provided with heating means. Extraction under the ordinary pressure is sufficient. Methodical extraction, employing a battery of extractors arranged to allow some form of a countercurrent extraction, is frequently useful. Whatever the apparatus employed, the vegetable material, which is preferably as dry as possible, is extracted with the deresinating solvent until practically all the resins are removed. Before the extraction, the material is preferably fine ground. The wood, etc., may be ground dry if desired, or it may be "wet ground" in the presence of the solvent to be used. The extracting operation may be advantageously so conducted as to give as concentrated a solution of resin in the solvent as possible. From the resin solution however obtained, the solvent may be recovered by distillation.

The resin solvent employed is preferably, like those recited, soluble in water, so that after the resin extraction is complete, the residual solvent may be removed and recovered by washing with water. This is an important point, since the solvents which are immiscible with water like the petroleum hydrocarbons, etc., have a tendency to remain with and contaminate the rubber. Most such immiscible solvents moreover are solvents for both resin and rubber, and being rubber solvents, they soften the rubber in the woody material, making it sticky and hard to separate.

The extracted and deresinated mass of woody fiber contains practically all the original rubber, together with the vegetable fiber, sticks, stones, sand, dirt, etc. This mass is practically the same as the original material save that it no longer contains the sticky and viscid resins. Upon now placing it in a suitable beating or stirring apparatus together with water, preferably hot, and churning or breaking for a time, the particles of rubber mutually and quickly cohere to form floating flakes or coagula while the remaining components of the mass sink to the bottom of the vessel upon discontinuing the action of the stirring mechanism. With the preliminary deresination of the woody material, the maceration at once gives an extraordinarily clean and easy separation of the rubber from the woody fiber and mechanical impurities. Water tends to wet the fiber and the mechanical impurities much more than it tends to wet the rubber, while the rubber being free of sticky resins now has no tendency whatever to stick to wet surfaces, either of the treating vessel, of the stirring members, or of the contained impurities. In the stirring, beating, or churning, the rubber particles therefore tend to cohere together into ever-growing masses, leaving the mechanical impurities. Any convenient form of macerator may be employed for treating the deresinated fibrous material. The invention is particularly adapted for the guayule wood but it of course may be employed upon any other vegetable fibrous mass containing rubber for which it is suitable.

In the described operation the grinding which was necessary in the extraction is very much lessened. A preliminary dry grinding of the rubber yielding plant does not tend to injure the rubber materially. By extracting the resin from the comminuted material, the latter is robbed of most of its stickiness, and upon now grinding in the presence of water but a short maceration is necessary to produce a clean separation of the rubber from the woody fiber and the mechanical impurities. This short maceration does not tend to deteriorate the quality of the rubber materially. The product obtained is a good quality of raw rubber which may go into trade directly without the necessity for deresinating or for any special mechanical treatment.

In deresinating the woody material, it is better to use a plurality of successively applied portions of solvent, methodically used. For instance, a fresh portion of ground guayule may be treated with a portion of solvent which has been used successively on one or two other portions of guayule and is almost saturated with resin. After removing this portion of solvent, the guayule may next be treated with a fresh solvent or a portion of solvent which has been used but once before. In this manner of operation the fresh rubber yielding fiber is always treated first with a solvent which is nearly saturated with resin, while material which is nearly deresinated is exposed to the action of fresh solvent.

While the crude woody material which has been deresinated by solvents in the manner described may subsequently be treated by extracting means, such as solvents for rubber, for separating the rubber from the residual woody fiber, etc., yet I prefer to employ the maceration with water after the preliminary deresinating step.

The solvents employed in the deresinating process being preferably miscible with water, any residual solvent which may remain in the rubber after the operation is removed by the water during the maceration and may subsequently be recovered therefrom.

In a typical embodiment of the present invention, guayule wood is first fine ground to a fineness suitable for good extraction. While the wood may be ground with the solvent, it is not ordinarily necessary. The dry, ground material is next extracted with a resin solvent in any suitable apparatus. Preferably this solvent is a mixture of ethyl acetate and ethyl alcohol. A good mixture for this purpose is 50 per cent. ethyl acetate and 50 per cent. ethyl alcohol, but the proportion of either may be increased as desired. It is not ordinarily desirable to use much less than 25 per cent. ethyl alcohol. Preferably the extraction is done in a plurality of stages and in a methodical manner, successive portions of solvent being employed on each portion of ground wood, and each portion of solvent being used with several portions of wood. After all the resin is substantially extracted from the ground wood, the material is placed in a pebble mill with a suitable amount of water and macerated until the rubber has been separated from the fiber and mechanical impurities. In this operation, saturating and adhering solvent remaining in the material dissolves in the water in the macerating mill, the solvents employed being, as stated, preferably freely soluble in water. After the maceration is complete, this dissolved solvent may be easily recovered by passing the water used in the maceration through a fractionating still. While any ordinary form of still may be used for this purpose, the still of Patent #896,434, is particularly suitable and possesses a number of important advantages in this relation. Using ethyl acetate protected by alcohol or acetone, this distillation may be readily effected since the protecting solvent prevents any substantial hydrolysis of said ethyl acetate. After the maceration is complete, the rubber will be found in the form of clean, pure, floating coagula or flakes substantially free of resins, woody fiber, mechanical impurities, etc., and in condition to go directly into the trade after proper drying. The woody fiber and mechanical impurities will be accumulated at the bottom of the macerator. The waterproofing resin and rubber having been removed from the woody fiber by the described operations, such fiber readily absorbs water and becomes saturated or waterlogged so that it sinks.

The original material prior to the deresinating step contains considerable moisture even if air dried. This moisture, however, does no harm since it is extracted by the resin solvent, such solvent being, as stated, miscible with water. The resin-charged solvent obtained in this operation usually contains considerable water. The mixture of solvent, moisture and resin may be directly separated by fractional distillation.

What we claim is:—

1. The process of preparing rubber which comprises deresinating a crude vegetable material of the character described containing rubber by treatment with a volatile solvent, and thereafter separating the rubber from the remaining impurities.

2. The process of preparing rubber which comprises deresinating a crude vegetable material of the character described containing rubber by treatment with a volatile solvent, and thereafter separating the rubber from the remaining impurities by maceration with water.

3. The process of preparing rubber which comprises deresinating a crude vegetable material containing rubber by a protected ester, and thereafter separating the rubber from the remaining impurities by maceration with water.

4. The process of preparing rubber which comprises deresinating a crude vegetable material containing rubber by a solvent comprising ethyl acetate, and thereafter separating the rubber from the remaining impurities by maceration with water.

5. The process of preparing rubber which comprises deresinating a crude vegetable material of the character described containing rubber by a volatile solvent adapted to extract resin but having substantially no solvent power for rubber, and thereafter separating the rubber from such material.

6. The process of preparing rubber which comprises deresinating a crude vegetable material of the character described containing rubber by a volatile solvent adapted to extract resin but having substantially no solvent power for rubber, and thereafter separating the rubber from such material by maceration with water.

7. The process of preparing rubber which comprises deresinating a crude vegetable material containing rubber by a solvent composed of ethyl acetate and ethyl alcohol, and thereafter separating the rubber from the remaining impurities by maceration with water.

8. The process of preparing rubber which comprises comminuting a crude vegetable material of the character described containing rubber, deresinating such comminuted material by a volatile solvent adapted to extract resin but having substantially no solvent power for rubber, and thereafter separating the rubber from the deresinated material.

9. The process of preparing rubber which comprises deresinating a crude vegetable material of the character described containing rubber by a volatile solvent adapted to extract resin but having substantially no solvent power for rubber, separating the rubber from such material by maceration in the presence of water, and thereafter recovering the solvents by fractional distillation.

10. The process of preparing rubber which comprises comminuting a crude vegetable material containing rubber, deresinating the comminuted material by a solvent comprising ethyl acetate and ethyl alcohol, separating the rubber from the woody fiber and mechanical impurities by maceration with water, and thereafter recovering the solvent employed by fractional distillation.

11. The process of extracting rubber from guayule which comprises comminuting crude guayule, extracting the comminuted material with a volatile solvent for resin and macerating the deresinated material with water to separate rubber from mechanical impurities.

12. The process of extracting rubber from guayule which comprises comminuting crude guayule, extracting the comminuted material with a volatile resin solvent comprising an acetic ester and a protective solvent, and macerating the deresinated material with water to separate rubber from the mechanical impurities.

In testimony whereof, we affix our signatures in the presence of witnesses.

HARRY O. CHUTE.
FRANK L. RANDEL.

Witnesses:
ROSE MEYERS,
K. P. MCELROY.